United States Patent [19]

Wagener

[11] Patent Number: 5,008,493

[45] Date of Patent: Apr. 16, 1991

[54] HOLDER WITH BUSBARS FOR A BUSBAR SYSTEM

[76] Inventor: Hans Wagener, Rittershäuser Str. 14, 6344 Dietzhölztal-Rittershausen, Fed. Rep. of Germany

[21] Appl. No.: 333,296

[22] Filed: Apr. 4, 1989

[30] Foreign Application Priority Data

Apr. 6, 1988 [DE] Fed. Rep. of Germany ....... 3811456

[51] Int. Cl.$^5$ .......................... H02G 5/04; H02B 1/04; H02B 1/20; H01R 25/14
[52] U.S. Cl. .................................. 174/68.2; 174/99 B; 361/353; 361/355; 439/110; 439/212
[58] Field of Search ................... 174/16.2, 68.2, 70 B, 174/71 R, 71 B, 72 R, 72 B, 72 C, 84 S, 88 B, 88 S, 99 B, 99 E, 100, 129 B, 133 B, 149 B, 171; 361/341, 342, 353, 355, 361, 363, 376, 378; 439/110, 113, 114, 115, 119, 120, 207, 210, 212, 213, 214

[56] References Cited

U.S. PATENT DOCUMENTS

| 2,146,829 | 2/1939 | MacFarlane et al. | 439/120 |
| 3,219,887 | 11/1965 | Gerg et al. | 174/99 B X |
| 3,280,245 | 10/1966 | Rodeseike | 174/171 X |
| 3,411,042 | 11/1968 | Klein | 361/353 |
| 3,769,553 | 10/1973 | Coley | 361/353 |

FOREIGN PATENT DOCUMENTS

| 7435327 | 1/1975 | Fed. Rep. of Germany. |
| 7442827 | 4/1975 | Fed. Rep. of Germany. |
| 2722880 | 12/1977 | Fed. Rep. of Germany. |
| 7918946 | 12/1979 | Fed. Rep. of Germany. |
| 3143518 | 5/1983 | Fed. Rep. of Germany ...... 439/119 |

Primary Examiner—Laramie E. Askin
Attorney, Agent, or Firm—Malcolm B. Wittenberg

[57] ABSTRACT

A holder with busbars for a busbar system to connect electrical equipment, the holder consisting of a rectangular and plate-shaped insulating support with receptacles for busbars located in its top and a channel-shaped receptacle into which the insulating support is inserted. A number of busbar sections are fixed in position in the receptacles and run parallel to one another at uniform intervals. So that electrical equipment can be connected both electrically and mechanically at any point along the holder, which extends over the entire lengths of the busbar sections, the longitudinal sides of the rectangular and plate-shaped insulating support are aligned in the longitudinal direction of the busbar sections, each busbar section has connection portion for snap-on contacts of the equipment projecting perpendicularly from the top of the insulating support, and the channel-shaped receptacle is provided with latching receptacles along the longitudinal sides of the insulating support for engaging latching projections of the equipment.

3 Claims, 1 Drawing Sheet

HOLDER WITH BUSBARS FOR A BUSBAR SYSTEM

The invention concerns a holder with busbars for a busbar system for the connection of electrical equipment, said holder consisting of an insulating support with receptacles for busbars provided in its top and a channel-shaped receptacle into which the insulating support is inserted. A number of busbar sections are fixed in position in said receptacles at uniform spacing parallel to one another.

A holder of this type is disclosed in German Patent 31 43 518 (corresponding U.S. Pat. No. 4,457,481). In that patent, the holder is designed as a narrow, cuboid mounting that extends perpendicularly to the busbar sections and fixes said busbar sections in position at a distance from the mounting surface. The busbar sections are fixed to the mounting surface in the longitudinal direction of the busbar sections at a number of points, spaced apart from one another, by means of this type of holder. Thus, electrical equipment can be connected to the busbar sections in the area between the holders but not in the area of the holders, as the busbar sections are held in receptacles of the holder by means of covers. In addition, the busbar sections between the holders are not insulated and protectively covered on the side facing the mounting surface.

It is the object of this invention to produce a holder of the type described above, said holder permitting the connection of electrical equipment to the busbar sections at any position therealong and isolating and covering these busbar sections on the side facing the mounting surface.

The invention achieves this object in that the longitudinal sides of a rectangular and plate-shaped insulating support forming part of the holder are aligned in the longitudinal direction of the busbar sections; in that, to electrically connect the equipment, each busbar section has a connection portions projecting perpendicularly to the top of the insulating support for snap-on contacts of the equipment; and in that, to mechanically fix the equipment in position, a channel-shaped receptacle into which the insulating support is inserted is provided, the channel-shaped receptacle having holding hardware extending along the longitudinal sides of the insulating support for retaining the equipment.

In this design, the insulating support may extend over the entire length of the busbar sections without impairing the mounting of equipment at any desired position. Thus, the busbar sections can also be completely insulated and covered on side facing the mounting surface so that the possibility of an unintentional short circuit is considerably reduced.

The busbar sections are fixed in position on the insulating support according to one design by each being held between two retaining studs that are formed on the top of the insulating support and enclose the busbar sections up to the connection portions.

The insulating support can be improved by the retaining studs having an undercut hole into which cross arms of the busbar sections aligned parallel to the top of the insulating support are inserted. The busbar sections can then no longer be pulled out perpendicularly to the top of the insulating support.

The protection against short circuits is increased even more according to an additional design in that partitions are formed in the center between the busbar sections on the top of the insulating support, said partitions running parallel to the connection portions of the busbar sections and terminating flush with the tops of these portions, and in that in the area of its longitudinal sides, the insulating support is equipped with formed end bridges which project perpendicularly to the top of the insulating support and extend into the area of the free ends of the connection portions of the busbar sections and of the partitions.

The holder also includes a channel-shaped receptacle into which the insulating support is inserted, the channel-shape receptacle having side walls that enclose the end bridges on the outside and flanges that enclose the end faces of the end bridges and which are connected, preferably screwed, to the end faces of the end bridges. Then, mounting the equipment onto the holder is facilitated and improved by providing holding hardware in the form of latching receptacles and latching projections, the latching receptacles being slot-shaped bends in the side walls of the channel-shaped receptacle that are opened on the insides facing one another and the equipment, and the latching projections being formed on the housing of the equipment. The equipment need only be snapped onto the holder. In so doing, the snap-on contacts of the equipment make the electrical connection of the equipment to the busbar sections, and the latching connections between the latching receptacles and the latching projections mechanically fix the equipment in position on the holder. The equipment can also easily be removed from the holder again by simply pulling it off.

The elasticity of the holding hardware required for the latching connections is achieved simply in that the channel-shaped receptacle is made of elastic material.

If the equipment housing and the latching projections of the equipment housing are made of electrically conducting material, the equipment snapped onto the holder can easily be connected to neutral or ground because the channel-shaped receptacle is made of electrically conducting material and because the mounting surface, e.g. the control cabinet wall, is also made of metal and is at ground potential.

A busbar system can easily be expanded with this type of holder in that busbar sections terminate flush with the narrow sides of the insulating support and that when the holders are connected in a row, the busbar sections are connected electrically in the area of the joint of the insulating supports by means of electrically conducting connectors. The space for the connectors can be created simply by having the end faces of the retaining studs for the busbar sections stop some distance from the narrow sides of the insulating supports.

The invention is explained in more detail using an implementation example.

Figure 1:
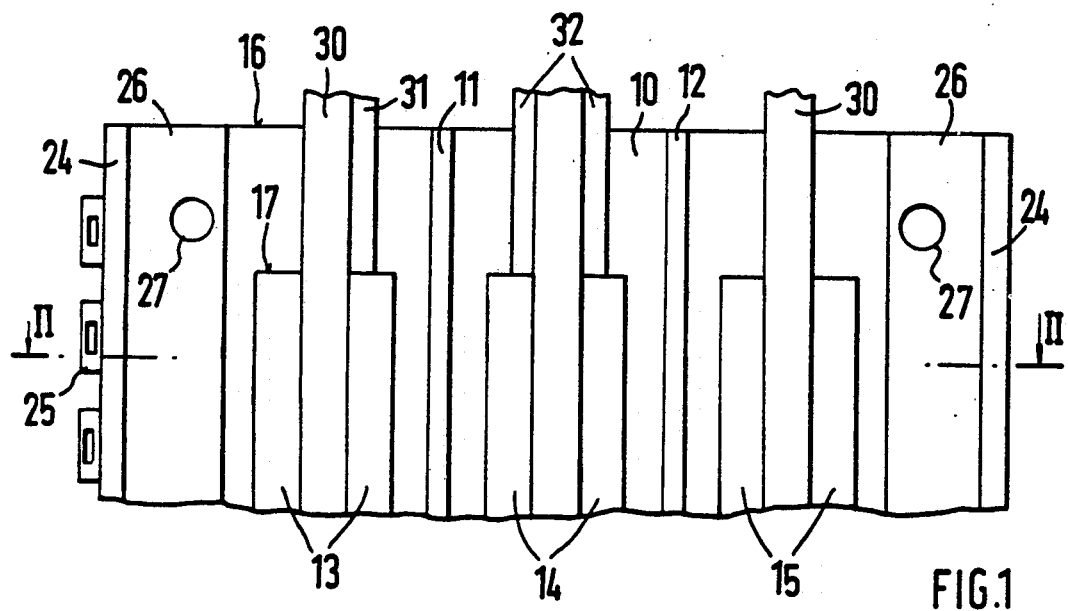
FIG. 1 is a partial plan view of the holder with busbars in the area of one narrow side.
Figure 2:
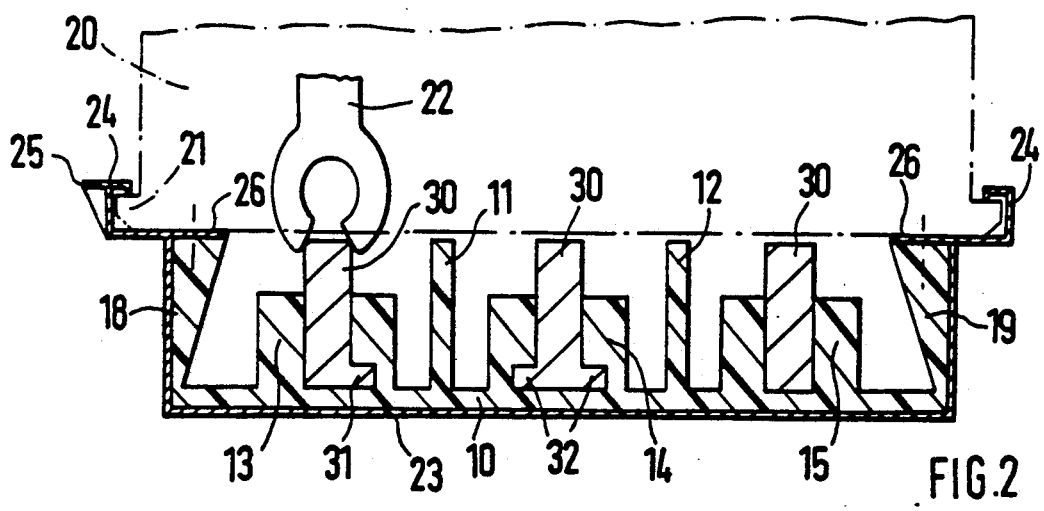
FIG. 2 is a cross section through the holder along the line II—II of FIG. 1.

In the implementation example, the insulating support 10 is made of electrically non-conducting material and is rectangular and plateshaped. The narrow sides 16 of the insulating support 10 extend perpendicular to the longitudinal direction of the busbar sections 30. The longitudinal sides of the insulating support 10 extend virtually over the entire lengths of the busbar sections 30. The receptacles for the busbar sections 30 are each formed by two retaining studs 13, 14 or 15 that are formed on the top of the insulating support 10 and project perpendicularly and that enclose the busbar sections 30 up to a part used as a connection portion, as shown in the cross-sectional view of FIG. 2. In this respect, the busbar section 30 which has a rectangular cross section can be clamped in position only between the two retaining studs 15. The two retaining studs 13 and 14 can, however, be provided with an undercut hole for a cross arm 31 or 32 of the busbar sections 30 in order to fix the busbar sections 30 in position perpendicularly to the top of the insulating support 10 so that they cannot be pulled off.

The connection portions of the busbar sections 30 project from the retaining studs 13, 14 and 15 so that snap-on contacts 22 of electrical equipment 20 may be pushed onto said arms to provide an electrical connection between the equipment 20 and the busbar sections 30 merely by mounting the equipment 20. The retaining studs stop short of the end faces of the insulating support 10, as shown at 17, to create space for connectors to connect adjacent busbar sections.

The partitions 11 and 12 are formed between adjacent busbar sections 30 on the top of the insulating support 10, said partitions being aligned in parallel with the connection portions of the busbar sections 30 and terminating flush with the free ends of the connection portions. In respect, the partitions 11 and 12 are arranged in the center of the busbar sections 30 adjacent to one another. This increases the protection against short circuits in the area of the holder. The same purpose is served by the end bridges 18 and 19 which are formed in the area of the longitudinal sides of the insulating support 10 and which project perpendicularly. The insulating support 10 consists of a material selected to provide great electrical insulation. This material is usually not elastic. For this reason, the insulating support 10 is inserted in a channel-shaped receptacle 23 which has side walls that enclose the end bridges on the outside and which has flanges 26 enclosing the end faces of the end bridges 18 and 19. As the holes 27 show, the flanges 26 may also be screwed to the end bridges 18 and 19 by mounting screws. The mounting screws can also fix the holder in position on the mounting surface at the same time.

Holding hardware designed as latching projections 21 is formed on the sides of the equipment 20 facing away from one another. The channel-shaped receptacle 23 transforms in the area of the longitudinal sides into holding hardware designed as slot-shaped latching receptacles 24. These latching receptacles are opened on the sides facing one another which also face the sides of the equipment 20 having the latching projections 21. The latching projections 21 of the equipment 20 can be latched to the channel-shaped receptacle 23 and thus to the holder by deflection of the latching receptacles 24. Thus, the equipment 20 is mechanically fixed in position on the holder by a simple latching motion. The equipment 20 can be connected to the busbar sections 30 at any desired position of the holder with the snap-on contacts 22 producing the electrical connection with the connection portions of the busbar sections and the latching connections between the latching receptacles 24 and latching projections 21 mechanically fixing the equipment 20 in position on the holder.

These mechanical latching connections and these electrical connections also allow the equipment to be removed from the holder just as quickly and easily. On the channel-shaped receptacle 23, mounting lugs 25 or the like may be formed in the area of at least one latching receptacle, said lugs being utilized, for example, to fix connecting cables and/or interconnecting cables in position.

I claim:

1. A holder having currentcarrying busbars for a busbar system for connecting electrical equipment, said holder comprising a rectangularly-shaped insulating support having an upper side and parallel, equally spaced sockets in the upper side, current-carrying busbar sections fixed in said sockets, the longitudinal sides of the insulating support being aligned along the longitudinal direction of the busbar sections, the current-carrying busbar sections each having a connection portion extending perpendicularly from the top of the insulating support for plug contact with electrical equipment, the longitudinally-extending sides of the insulating support having end bridges which extend from the top of the insulating support perpendicularly and terminate in end faces which lie in the same plane as the ends of said connection portions of the current-carrying busbar sections, said insulating support further having separating partitions between the busbar sections, and the insulating support being set into a channel-shaped receptacle made of elastic material, the side walls of which enclose the end bridges at the outside, the receptacle having front faces which overlie the end faces of the end bridges and slot-shaped latching receptacles on the side walls which open toward each other for mechanical attachment of electrical equipment.

2. The holder with busbars of claim 1 wherein the channel-shaped receptacle is formed of electrically conductive material.

3. The holder with busbars of claim 1 or 2 wherein the channel-shaped receptacle is screwed to the insulating support.

* * * * *